No. 726,868. PATENTED MAY 5, 1903.
F. B. COREY.
TROLLEY WHEEL.
APPLICATION FILED AUG. 21, 1902.
NO MODEL.
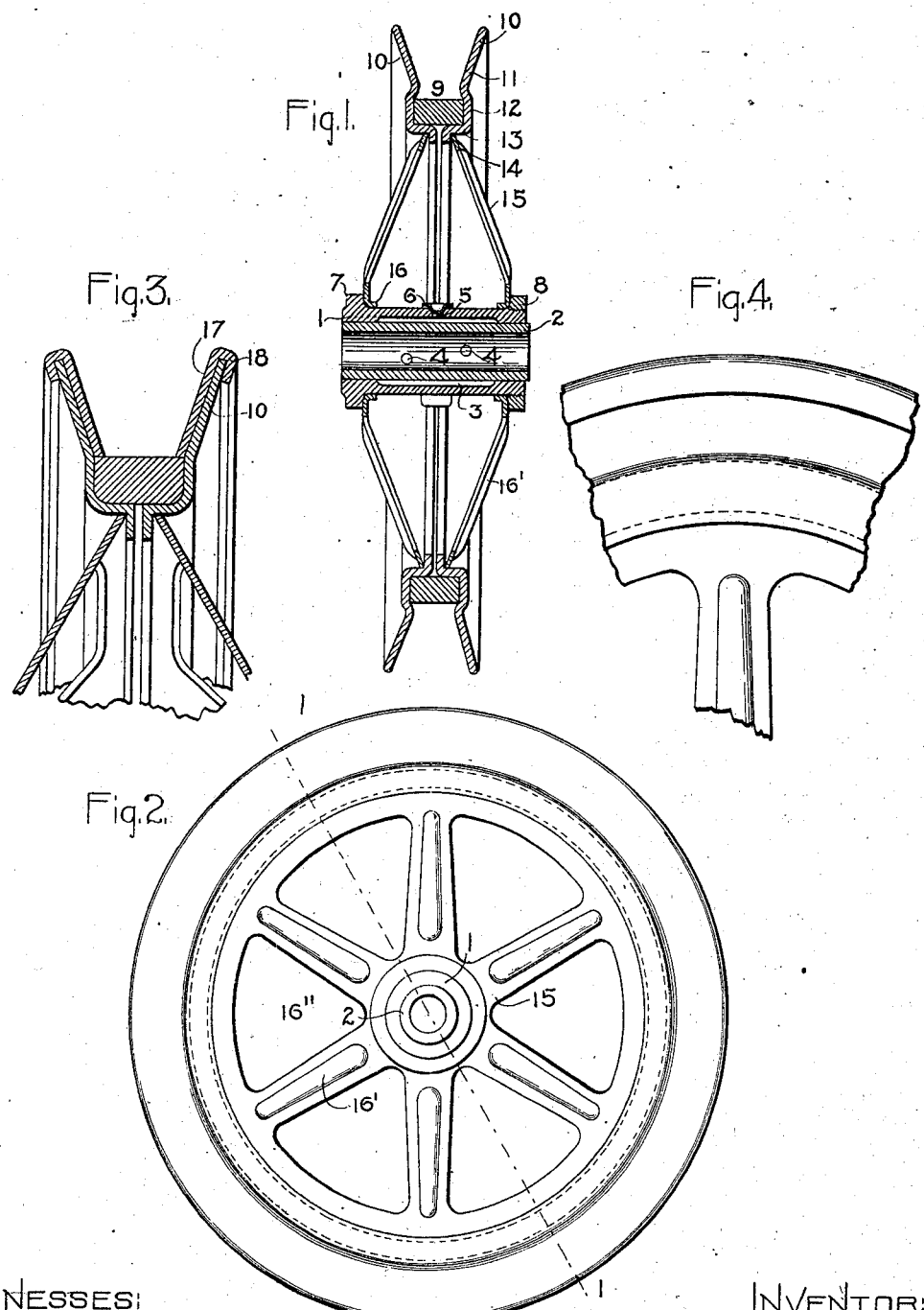
Witnesses:
Inventor:
Fred B. Corey,
by Albert G. Davis
Atty.

No. 726,868. Patented May 5, 1903.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

TROLLEY-WHEEL.

SPECIFICATION forming part of Letters Patent No. 726,868, dated May 5, 1903.

Application filed August 21, 1902. Serial No. 120,482. (No model.)

*To all whom it may concern:*

Be it known that I, FRED B. COREY, a citizen of the United States, residing at Schenectady, in the county of Schenectady, State of New York, have invented certain new and useful Improvements in Trolley-Wheels, of which the following is a specification.

My invention relates to improvements in trolley-wheels, and especially to trolley-wheels of comparatively large diameter to be used on rapidly-moving vehicles. In trolley-wheels of this class it is especially desirable that the wheel be lightly constructed and in perfect balance.

The object of my invention is the production of a trolley-wheel in which the weight of the wheel is reduced to a minimum and which will be symmetrical in form, and hence easily balanced.

A further object of my invention is the production of a trolley-wheel constructed principally out of sheet metal and in which the parts exposed to wear are readily removable.

In the accompanying drawings, one form of my invention is shown in Figures 1 and 2, of which Fig. 2 is an elevation, and Fig. 1 is a section taken on line 1 1 of Fig. 2. Fig. 3 shows in section, and Fig. 4 in elevation, a modified form of my invention.

The hub 1 of the trolley-wheel is tubular in form and is provided with the usual bushing 2, in which the journal supporting the wheel is mounted. An oil-receptacle 3 is formed intermediate the ends of the hub surrounding the bushing, and suitable orifices 4 are provided by means of which the oil is conducted to the interior surface of the bushing. An opening 5 and cap 6 are provided for introducing the oil into the oil-receptacle. A cylindrical flange or rib 7 is formed at one end of the hub. The other end of the hub is screw-threaded and has a ring-shaped nut 8 threaded on it. The nut 8 is so proportioned that when assembled the two ends of the hub are symmetrical.

The tread of the wheel consists of a ring-shaped piece 9, of substantially rectangular cross-section, made out of copper or other suitable material. This piece may be formed, if desired, by cutting off a section of a tube. The flanges 10 of the wheel are made out of sheet metal and are annular-shaped. The portion 11 of the flange is flared in the usual manner. An intermediate portion 12 is perpendicular to the axis of the wheel and abuts against the edge of the tread portion 9. Another portion of the flange 13 adjacent to the portion 12 extends at right angles thereto. The inner portion 14 of the flange is parallel to the portion 12. The flanges 10 are so proportioned that the portions 13 form a cylindrical bearing-surface for the tread-piece 9 of a width slightly less than that of the tread-piece and of a diameter initially sufficiently greater than that of the internal diameter of the tread-piece 9 to make a tight fit when assembled as shown in Fig. 1.

A pair of dish-shaped clamping members or spiders 15, made out of sheet metal, are employed to sustain the rim portion of the wheel. The clamping members are provided with a central orifice in which the hub of the wheel fits. A flange 16 is formed on the inner face of the clamping members in order to make a more rigid connection with the hub. Portions of the clamping members may be cut away, as indicated at 16'', in order to reduce the weight of the wheel. Radial stiffening corrugations 16' may be formed in the spider, if desired. The outer periphery of the clamping members engage the portions 13 and 14 of the flanges 10 at their intersection, as clearly shown in Fig. 1.

In assembling the wheel the clamping member shown at the left in Fig. 1 is placed on the hub. The flanges 10 and tread-piece 9 are then placed in position against the periphery of the left-hand clamping member and the right-hand clamping member is placed in position. The nut 8, which is provided with suitable spanner-openings, (not shown,) is then forced home. This makes the whole wheel rigid, and as the parts are made out of sheet metal any slight imperfection in fit will be overcome in the assembling process. When the tread-piece 9 or the flanges 10 wear out, it is only necessary to unscrew the nut 8 in order to remove the worn piece or pieces and replace them by new ones.

In Figs. 3 and 4 I have shown a slightly-modified form of my invention in which ring-shaped pieces of metal, such as brass, are used to form a lining for the flanges 10, which are preferably made of steel. These lining-pieces 17 have their outer peripheries turned over the outer periphery of the supporting-flange 10, forming a bead 18. The use of the lining-flange 17, made out of brass or some other comparatively soft metal, is desirable, especially in trolley-wheels carried by high-speed vehicles, as the softer material does not wear the trolley-wire as rapidly as does the steel flange. The surface of the steel flange is apt to become file-like from the constant arcing to which it is exposed. In the construction shown in Figs. 3 and 4 the bead 18 forms a means for securing the flange 10 and the lining 17 rigidly together. It also protects the trolley-wire from all danger of coming in contact with the steel flange of the trolley-wheel.

The clamping members or spiders 15 and the flange members are both preferably formed by stamping them from sheet metal. The lining-pieces 17 are preferably formed in the same manner, and the bead 18 may be turned over the outer edge of the flange 10 in like manner.

Modifications in the form and construction of my trolley-wheel may be made without departing from my invention, as I do not consider it to be limited to the exact details here shown.

What I claim as new, and desire to secure by Letters Patent of the United States, is—

1. The combination of a pair of flanges, a pair of clamping members, and a ring-shaped tread-piece positioned by the flanges, the flanges and tread-piece being supported entirely by the clamping members.

2. In combination, a hub, a pair of sheet-metal spider members, an annular tread member, and a pair of sheet-metal flanges, the flanges supporting said tread member and being provided with means for engaging said spider members, and means for forcing said spiders together.

3. In combination, a hub, a pair of sheet-metal spider members, a pair of flange members, and a tread member carried by said flange members.

4. In combination, a pair of clamping members, a pair of flange members, and a ring-shaped tread member, the flange members having portions bent to embrace the sides and a portion of the inner periphery of the tread member, and other portions to form with the first-mentioned portions surfaces to be engaged by said clamping members, and means for forcing said clamping members together and thereby maintain the flanges and tread member in position.

5. In combination, an annular rim portion, a hub, and a pair of clamping members carried by said hub and supporting said rim portion, the clamping members being formed of sheet metal and dished so that they are separated at the hub more than they are at the rim, and means for forcing the central portions of the clamping members toward one another.

6. In combination, a ring-shaped tread member, a pair of annular flange members one at each side of the tread member, a portion of each flange member intermediate its edges being bent to form a cylindrical seat for the inner surface of said tread member, a hub, a pair of clamping members mounted thereon, the said clamping members engaging the inner edges of said flanges, and means for forcing the clamping members toward one another whereby the parts are rigidly held together.

7. In a trolley-wheel, a removable hard sheet-metal flange provided with a lining of suitable conductor-engaging material, the outer edge of said lining member being turned over and embracing the edge of said flange.

In witness whereof I have hereunto set my hand this 18th day of August, 1902.

FRED B. COREY.

Witnesses:
BENJAMIN B. HULL,
ALMA L. MENSCHKE.